United States Patent [19]

Lisenby

[11] Patent Number: 4,832,367
[45] Date of Patent: May 23, 1989

[54] BELT RESTRAINING APPARATUS FOR AUTOMOBILE PASSENGERS

[76] Inventor: David L. Lisenby, 1310 Franklin Ave., Laurinburg, N.C. 28352

[21] Appl. No.: 107,967

[22] Filed: Oct. 13, 1987

[51] Int. Cl.4 .............................................. B60R 22/00
[52] U.S. Cl. .................................. 280/808; 297/482; 297/483; 24/265 R
[58] Field of Search ............... 280/801, 808; 297/482, 297/483; 24/265 R, 442, 265 AL, 68 R

[56] References Cited

U.S. PATENT DOCUMENTS

| | | | |
|---|---|---|---|
| 2,002,946 | 5/1935 | Jacobs | 24/265 R |
| 3,313,511 | 4/1967 | Koerner et al. | 24/265 R |
| 3,572,833 | 3/1971 | Pavliscak | 297/389 |
| 3,713,693 | 1/1973 | Cadiou | 297/482 |
| 3,860,261 | 1/1975 | Takada | 280/808 |
| 3,955,734 | 5/1976 | Reese | 24/265 AL |
| 4,112,521 | 9/1978 | Uke | 24/442 |
| 4,146,268 | 3/1979 | Bost et al. | 297/389 |
| 4,236,755 | 12/1980 | Pollitt et al. | 297/483 |
| 4,243,266 | 1/1981 | Anderson | 297/483 |
| 4,289,352 | 9/1981 | Ashworth | 297/473 |
| 4,361,258 | 11/1982 | Clark | 24/68 R |
| 4,592,592 | 6/1986 | Peek | 297/483 |
| 4,609,205 | 9/1986 | McKeever | 280/808 |
| 4,648,625 | 3/1987 | Lynch | 280/808 |

Primary Examiner—Kenneth R. Rice
Attorney, Agent, or Firm—Bell, Seltzer, Park & Gibson

[57] ABSTRACT

A belt restraining apparatus is disclosed which includes a shoulder belt portion and a lap belt portion. The shoulder belt is positioned over one shoulder and across the chest of the passenger, and the lap belt is positioned across the lap of the passenger. An auxiliary strap extends vertically between and interconnects the lap belt and a medial portion of the shoulder belt. The strap is of a length to deflect the shoulder belt downwardly and away from the neck of the passenger to assure passenger comfort.

9 Claims, 2 Drawing Sheets

U.S. Patent    May 23, 1989    Sheet 1 of 2    4,832,367
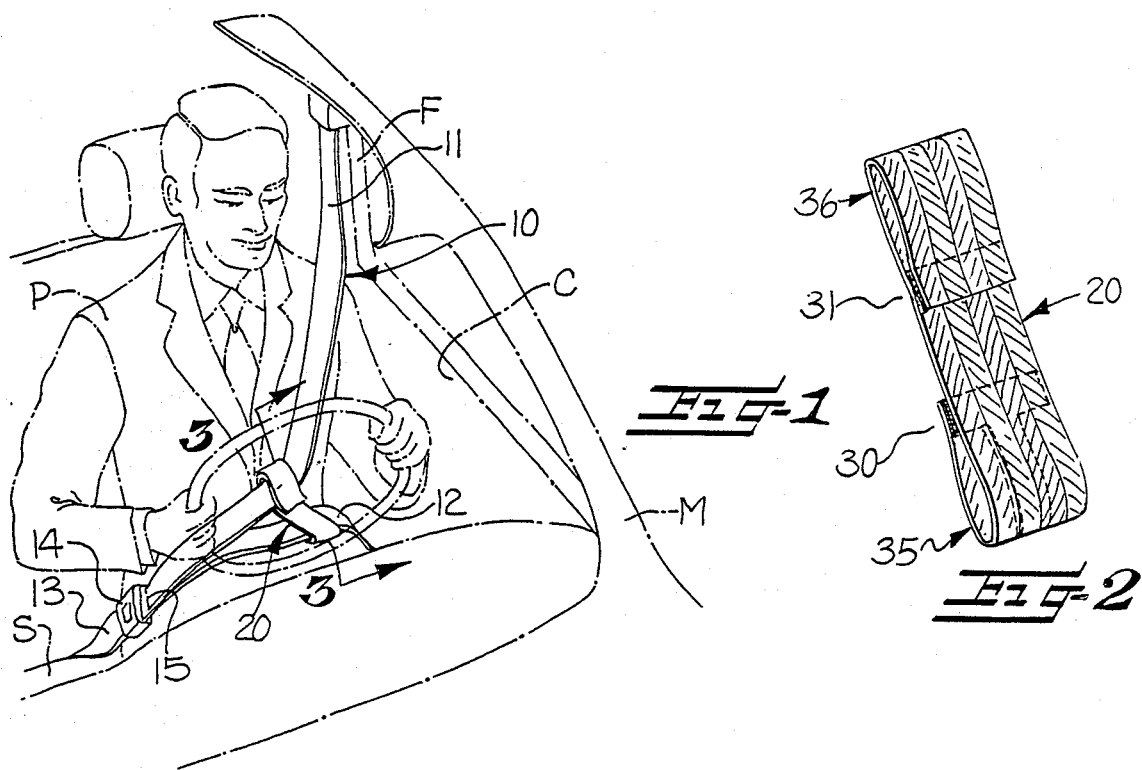
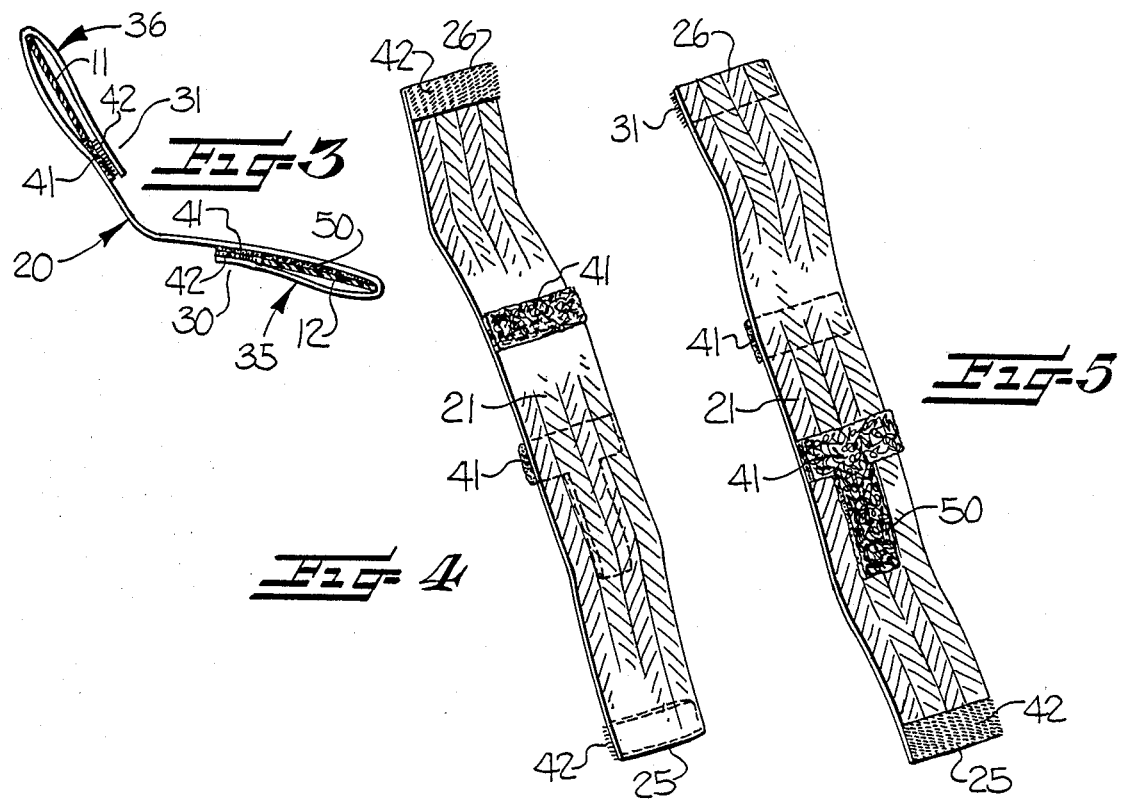

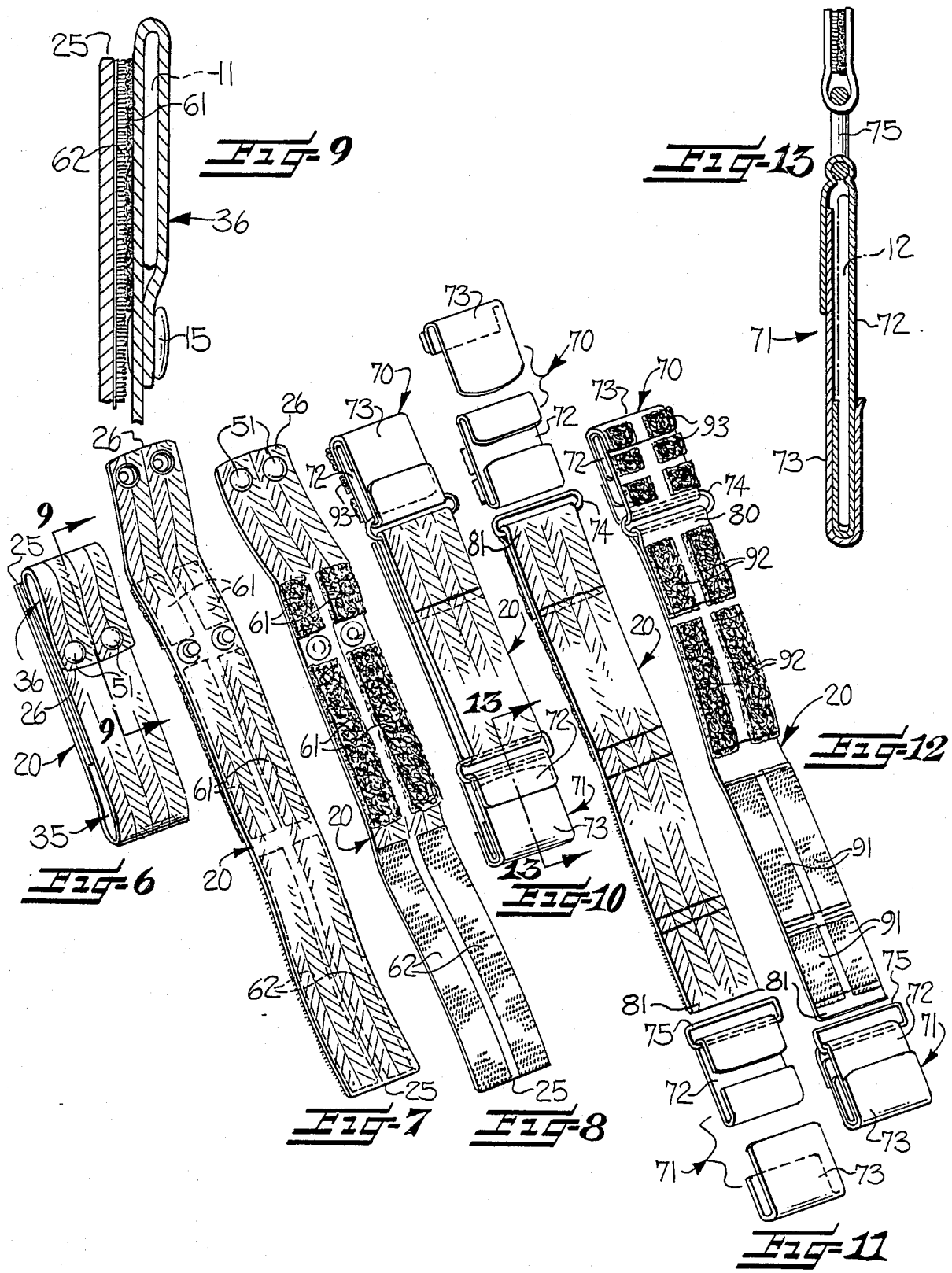

BELT RESTRAINING APPARATUS FOR AUTOMOBILE PASSENGERS

BACKGROUND OF THE INVENTION

This invention relates to belt restraints used for restraining a passenger while seated in a motor vehicle and more particularly to an automobile belt restraining apparatus which provides improved passenger comfort.

Most motor vehicles contain some type of belt restraint which is used to restrain a passenger while the passenger is seated in the vehicle. A common form of belt restraint is the three-point type having a combination of a shoulder belt and lap belt, with the shoulder belt extending from an upperpart of the vehicle frame diagonally across the shoulder and chest of a passenger and interconnecting with the lap belt which extends across the passenger's lap. Although this three-point belt restraint has proven to be one of the safest belt restraints currently used in motor vehicles, many passengers find the shoulder belt uncomfortable, since it engages the neck, causing a rubbing of the skin and chaffing.

Heretofore, attempts have been made to position the belt away from the passenger's neck without sacrificing the practical safety of the belt. For example, one prior device uses the door of the vehicle to support a bracket and flexible strap to pull the shoulder belt away from the passenger's neck, while another prior device adjusts the height of the shoulder belt through an auxiliary strap running over the seat back. However, it is believed these devices have not proven to be commercially successful, since they are cumbersome and difficult to use.

It is accordingly an object of the present invention to provide a simple and inexpensive belt restraining apparatus of the described type, and which supports the shoulder belt at a location separated from the neck of the passengers, to thereby improve passenger comfort.

A further object of this invention is to provide an auxiliary strap for use in adjusting the position of the shoulder belt in three-point type safety belts, and which is simple and inexpensive.

Another object of this invention is to provide an auxiliary strap for use in adjusting the position of the shoulder belt in three-point type safety belts, and which can adjust the position of the shoulder belt without interfering with the practical safety of the belt.

SUMMARY OF THE INVENTION

These and other objects and advantages of the present invention are accomplished by a belt restraining apparatus for restraining a passenger while seated in a motor vehicle, and wherein the apparatus includes a belt having a shoulder belt portion and lap belt portion, with both the shoulder and lap belt portions having respective ends which are fixed to the frame of the motor vehicle on one side of the seat. Means are provided for releasably attaching the belt to the frame of the motor vehicle at a location on the opposite side of the seat so that in the attached position, the shoulder belt portion is positioned over one shoulder and across the chest of the passenger and the lap belt portion is positioned across the lap of the passenger. In addition, a strap means extends generally vertically between and interconnects the lap belt portion and a medial portion of the length of the shoulder belt portion, and the strap means is of a length to support the shoulder belt portion so as to lie across the shoulder of the passenger but spaced from the neck of the passenger, to thereby assure passenger comfort.

In one embodiment of the invention, the strap means comprises a length of flexible webbing having first and second opposite ends. A first releasable interengaging means is mounted on the webbing to form the first end into a first loop which receives the lap belt portion therethrough. A second releasable interengaging means is also mounted on the webbing to form the second end into a second loop to receive the shoulder strap portion therethrough. The releasable interengaging means at each of the ends may comprise mating sections of hook means and pile means, or in the alternative, one of the interengaging means may comprise snap type mating fasteners and the other interengaging means comprises mating sections of hook means and pile means. Preferably, at least one of the sections has a substantial length to permit the length of the strap means to be adjusted.

In another embodiment of the invention, each of the first and second releasable interengaging means comprises a rigid member fixed to the associated end of the webbing, with each rigid member having a generally flat C-shaped outline and which is sized to receive the associated belt therewithin. In addition, each interengaging means may include a generally J-shaped member which is sized to fit over one of the edges of the associated C-shaped member and close the open front side thereof.

BRIEF DESCRIPTION OF THE DRAWINGS

Some of the objects and advantages of the present invention having been stated, others will be more fully understood by reference to the following drawings, in which FIG. 1 is a perspective view showing a standard three-point type automobile seat belt having an adjustable auxiliary strap interconnecting the shoulder and lap belts in accordance with the present invention;

FIG. 2 is a perspective view of a first embodiment of the auxiliary strap of the present invention;

FIG. 3 is a sectional view of the auxiliary strap taken substantially along line 3—3 of FIG. 1;

FIG. 4 is a perspective view of the front side of the auxiliary strap;

FIG. 5 is a perspective view of the rear side of the auxiliary strap;

FIG. 6 is a perspective view of a second embodiment of the auxiliary strap of the present invention;

FIGS. 7 and 8 are perspective views of the front and rear sides respectively of the embodiment of FIG. 6;

FIG. 9 is an enlarged sectional view taken substantially along line 9—9 of FIG. 6;

FIG. 10 is a perspective view of a third embodiment of the auxiliary strap of the present invention;

FIG. 11 is a perspective view with parts exploded of the front side of the embodiment of FIG. 10;

FIG. 12 is a perspective view of the rear side of the embodiment of FIG. 10; and FIG. 13 is a sectional view taken substantially along line 13—13 of FIG. 10.

DETAILED DESCRIPTION OF THE PREFERRED EMBODIMENTS

Referring more particularly to the drawings, one preferred embodiment of the invention is shown in FIG. 1 wherein a three-point type seat belt restraint 10 of conventional design is shown mounted in the passenger compartment C of a motor vehicle M. As is standard with most three-point type seat belts 10, the belt has a shoulder belt portion 11 and a lap belt portion 12 with respective ends fixed to the frame F of the vehicle on one side of the passenger seat S, usually the outboard side closest to the motor vehicle's door as illustrated. On the inboard side of the passenger seat S, an inboard belt 13 attaches to the frame F of the motor vehicle. The inboard belt 13 includes a conventional snap socket 14 for receiving and attaching the snap fitting 15 of the three-point type belt 10. As illustrated, in the attached position, the shoulder belt portion 11 is positioned over one shoulder and across the chest of the passenger P and the lap belt portion 12 is positioned across the lap of the passenger P, as is usual.

In accordance with the present invention, the three-point type seat belt 10 has an auxiliary strap 20 extending generally vertically between and interconnecting the lap belt 12 and a medial portion of the shoulder belt 11. The auxiliary strap 20 has a predetermined length, and acts to deflect the shoulder belt 11 so that it lies properly across the shoulder of the passenger, and also so as to be spaced away from the neck of the passenger. Thus the belt is supported so that it does not normally engage the neck, to thereby prevent chaffing of the skin and assure the passenger's comfort.

Referring to FIGS. 2 through 5, the illustrated embodiment of the auxiliary strap 20 comprises a length of flexible webbing 21 having first and second opposite ends 25, 26 respectively with a first releasable interengaging means 30 mounted on one side of the webbing 21 to form the first end 25 into a first loop 35 for receiving the lap belt 12 therethrough, and a second releasable interengaging means 31 mounted on the other side of the webbing 21 to form the second end 26 into a second loop 36 for receiving the shoulder belt 11 therethrough (FIGS. 2 and 3).

Each of the first and second releasable interengaging means 30, 31 comprises a respective pair of conventional fabric sections of pile means 41 and hook means 42 which releasably interengage with each other. Such releasable interengaging means are well known in the art, and are commercially sold under the trademark "Velcro." The sections of the hook means 42 are mounted at each end of the flexible webbing 21, and the cooperating sections of pile means 41 are mounted approximately 4" from the associated hook means 42, so that the pile means 41 and hook means 42 releasably engage with each other when the loops 35, 36 are formed by folding the auxiliary strap ends 25, 26 over upon themselves. When each loop is formed, the formed loops have sufficient clearance to allow the lap or shoulder belts to pass therethrough (FIG. 3).

The two fabric sections of the means 30 are mounted on the opposite side of the webbing from the sections of the means 31. As illustrated, the sections have a width corresponding to the width of the webbing, and a length of about ¾ inch, which has been found to provide sufficient shear strength to prevent the hook means 42 and pile means 41 from disengaging when the auxiliary strap 20 is in use.

The flexible webbing 21 is preferably of the same material and color as the seat belt 10, which is usually composed of a woven synthetic material, such as nylon, having a width of about 2 inches. However, any flexible material can act as the auxiliary strap 20, such as leather, cloth or any other material which exhibits the necessary properties of strength and flexibility. Depending on the particular three-point type seat belt 10 used, and the size of the passenger, the length of the webbing 21 can vary from 8" to 20," to assure the proper displacement of the shoulder belt 11 away from the neck of the passenger.

For aesthetic and functional purposes, the hook and pile sections used in forming the second loop 36 for receiving the shoulder belt 11 therethrough are positioned on the front side of the auxiliary strap 20 facing outwardly from the passenger seat while the first group of sections used to form the first loop 35 are positioned on the rear side of the strap 20 (FIGS. 4 and 5). When a passenger is seated and restrained by the seat belt 10, the passenger loops the first or bottom end 25 of the auxiliary strap 20 around the lap belt 12 so that the auxiliary strap end 25 extends downward along the front of the lap belt 12, around the lap belt's bottom and upward along the rear side thereof so as to interengage the hook means 42 and pile means 41 to form the loop 35. The shoulder belt 11 is then pulled down slightly and the other strap end 26 is then looped from the rear side of the shoulder belt 11 around the top and along the front side thereof. The hook means 42 and pile means 41 at this end are then interengaged. Because the strap 20 is looped from the front to the back at the lap belt 12, the look of a continuous piece of strap at the lap belt 12 is pleasing to the eye.

As best seen in FIG. 5, an additional 2" strip 50 of the pile means is mounted on the webbing so as to extend longitudinally downwardly from the section of the pile means 41 used in forming the second loop 36, and for substantially the entire length of that loop 36. This additional strip 50 frictionally engages the lap belt 12 to prevent inadvertant movement of the auxiliary strap 20 along the lap belt 12, so as to thereby maintain the desired placement of the strap 20 and the desired deflection of the shoulder belt 11.

Referring now to FIGS. 6–9, a second embodiment is shown wherein the second releasable interengaging means comprises cooperating snap fasteners 51 in lieu of the "Velcro" type interengaging means, while the first releasable interengaging means 30 includes a pair of parallel, elongated sections of pile means 61 and a pair of parallel, elongated sections of hook means 62. The elongated size of these sections is designed to permit the length of the auxiliary strap 20 to be adjusted, and allow the distance between the first and second loops 35, 36 to be adjusted to the individual needs of a passenger (FIGS. 7 and 8).

To use this adjustable strap of FIGS. 6–9, a passenger forms the second loop 36 around the shoulder belt 11 and secures the loop 36 in place via the snaps 51. The other end is then drawn over the front of the lap belt 12 around its botttom and upward along the lap belt 12 thereto. Since the hook and pile sections extend longitudinally along a substantial length of the auxiliary strap 20, the strap end 25 forming the first loop 35 may be pulled a specified distance so as to deflect the shoulder belt downwardly a predetermined distance. The portion of the pile means 61 and hook means 62 which do not releasably interengage with each other, but lie adjacent the lap belt 12 on either side thereof, act to frictionally engage the lap belt 12 and prevent a lateral displacement of the auxiliary strap 20 (FIG. 6). It is to be understood that the position of the hook and pile sections and snaps 51 could be switched so that the snaps 51 secure the loop 35 formed at the lap belt 12 instead of forming the loop 36 at the shoulder belt 11. Thus, the loop 36 formed at the shoulder belt 11 would be adjustable.

Referring now to FIGS. 10-13, a third embodiment is shown which comprises first and second loop forming means or belt retainers 70, 71 mounted adjacent the first and second ends 80, 81 respectively of the auxiliary strap 20. The retainers 70, 71 are adapted to receive the respective lap 12 and shoulder 11 belt (FIG. 10), and each comprises a rigid member 72 having a generally flat C-shaped outline which is sized to receive an associated belt portion therewithin (FIG. 11). Each member 72 also includes opposite edges which are arcuately curved when viewed in cross section and an open front side. Another rigid member 73, of generally J-shaped configuration when viewed in cross section, is adapted to fit over one of the edges of the associated C-shaped member 72 and close the open front side thereof (FIGS. 11 and 13).

The belt retainer members 72, 73 can be made of any common rigid material such as metal or plastic. Preferably, the belt retainer members 72, 73 should be dimensioned so that when the associated belt portion extends therethrough, enough friction will be generated to prevent either belt retainer member from sliding on the associated belt (FIG. 13).

The belt retainer member 72 of the loop forming means 70 is secured on the auxiliary strap's first end 80 by a loop ring 74, with the ring 74 being secured to the webbing by a looped end which is secured by stitching. The belt retainer member 72 of the loop forming means 71 also has a loop ring 75 attached thereto but it is free to slide along the auxiliary strap 20. As best seen in FIG. 12, one side of the webbing mounts a first pair of parallel fabric sections of hook means 91, and a second pair of parallel fabric sections of pile means 92. Both of these pair of fabric sections are of substantial length, and thus the strap 20 may be folded upon itself at any length and retained in its folded position by the interengagement of the hook means 91 and pile means 92 (FIG. 12).

To use the strap 20, the first belt retainer 70 is secured to the shoulder belt 11 at a predetermined position. The second belt retainer 71 is secured to the lap belt 12. Securing of the belt retainers 70, 71 to the belts is accomplished by placing the belts through the open area of the C-shaped member 72 and then sliding the J-shaped member 73 onto the other member 72 to close the retainer. The other end 81 of the auxiliary strap 20 not secured to the loop ring 74 of the first belt retainer 70 is placed through the loop ring 75 of the second retainer 71. The strap 20 is folded back upon itself and secured by associated hook means 91 and pile means 92. The auxiliary strap's length may be adjusted as necessary to deflect the shoulder belt 11 a specified distance.

As shown in FIG. 12, sections of pile means 93 may be positioned on the rear side of the first belt retainer 70 to give an additional area wherein the hook means 91 may be secured so as to shorten even more the auxiliary strap 20.

As an alternative to the specific construction of the belt retainers 70, 71 as shown and described herein, the retainers may be modified so that the entire belt retainer may be one entire piece, optionally having a hinged top portion which can be secured by either "Velcro" or snap type fasteners. The associated belts may then be slid through the top opening, the hinge closed, and the belt is retained within. Materials suitable for this application include any of the flexible plastics, especially polypropylene, which exhibit good flexural properties along hinge lines.

The foregoing embodiments are to be considered illustrative rather than restrictive of the invention and those modifications which come within the meaning and range of equivalents of the claims are to be included therein.

That which is claimed is:

1. A belt restraining apparatus for restraining a passenger while seated in a seat of a motor vehicle, and comprising
    a belt comprising a shoulder belt portion and a lap belt portion, said shoulder and lap belt portions having respective ends which are fixed to the frame of said motor vehicle on one side of said seat,
    means for releasably attaching said belt to the frame of said motor vehicle at a location on the opposite side of said seat, and such that in the attached position the shoulder belt portion is positioned over one shoulder and across the chest of the passenger and the lap belt portion is positioned across the lap of the passenger, and
    strap means extending generally vertically between and interconnecting said lap belt portion and a medial portion of the length of said shoulder belt portion, with said strap means having a length so as to deflect said shoulder belt portion downwardly and away from the neck of the passenger to thereby assure passenger comfort.

2. The belt restraining apparatus as defined in claim 1 wherein said strap means comprises
    a length of flexible webbing having first and second opposite ends,
    first releasable interengaging means mounted on said webbing and forming said first end into a first loop which receives the lap belt portion therethrough, and
    second releasable interengaging means mounted on said webbing and forming said second end into a second loop which receives said shoulder belt portion therethrough.

3. The belt restraining apparatus as defined in claim 2 wherein said first releasable interengaging means comprises a section of hook means and a section of pile means mounted on one side of said webbing and said second releasable interengaging means comprises a section of hook means and a section of pile means mounted on the other side of said webbing, with said hook means and pile means being adapted to releasably engage each other.

4. The belt restraining apparatus as defined in claim 2 wherein one of said first and second releasable interengaging means comprises cooperating snap fastener means positioned on said webbing, and the other of said first and second releasable interengaging means comprises a section of hook means and a section of cooperating pile means mounted on the other side of said webbing.

5. The belt restraining apparatus as defined in claim 4 wherein at least one of said sections has a substantial longitudinal length so as to permit the length of said strap means to be adjusted.

6. The belt restraining apparatus as defined in claim 2 wherein each of said first and second releasable interengaging means comprises a rigid member fixed to the associated end of said webbing, with each rigid member having a generally flat C-shaped outline and which is sized to receive the associated belt therewithin.

7. The belt restraining apparatus as defined in claim 6 wherein each of said C-shaped members includes opposite edges which are arcuately curved when viewed in cross section, and an open front side, and wherein each of said first and second releasable interengaging means further comprises a rigid member of generally J-shaped outline when viewed in cross section which is adapted to fit over one of said edges of the associated C-shaped member and close the open front side thereof.

8. An auxiliary strap adapted for use in association with a belt restraining apparatus of the type comprising a shoulder belt portion and a lap belt portion and which is designed for restraining a passenger while seated in a seat of a motor vehicle, said strap comprising
   a length of flexible webbing having first and second opposite ends,
   loop forming means mounted adjacent said first end of said strap and which is adapted to receive the lap belt portion of the belt restraining portion therethrough,
   loop forming means mounted adjacent said second end of said strap and which is adapted to receive the shoulder belt portion of the belt restraining portion therethrough, and
   wherein each of said first and second loop forming means comprises a rigid member having a generally flat C-shaped outline and which is sized to receive the associated belt portion therewithin.

9. The auxiliary strap as defined in claim 8 wherein each of said C-shaped members includes 1 opposite edges which are arcuately curved when viewed in cross section, and an open front side, and wherein each of said first and second loop forming means further comprises a rigid member of generally J-shaped outline when viewed in cross section which is adapted to fit over one of said edges of the associated C-shaped member and close the open front side thereof.

* * * * *